(12) United States Patent
Wotzak

(10) Patent No.: US 9,441,541 B2
(45) Date of Patent: Sep. 13, 2016

(54) OIL SCOOP MANIFOLD

(71) Applicant: General Electric Company, Schenectady, NY (US)

(72) Inventor: Mark Gregory Wotzak, Somerville, MA (US)

(73) Assignee: General Electric Company, Schenectady, NY (US)

( * ) Notice: Subject to any disclaimer, the term of this patent is extended or adjusted under 35 U.S.C. 154(b) by 569 days.

(21) Appl. No.: 13/793,266

(22) Filed: Mar. 11, 2013

(65) Prior Publication Data

US 2013/0283758 A1 Oct. 31, 2013

Related U.S. Application Data

(60) Provisional application No. 61/639,324, filed on Apr. 27, 2012.

(51) Int. Cl.
| | |
|---|---|
| *F02C 7/06* | (2006.01) |
| *F01D 25/18* | (2006.01) |
| *F16C 33/66* | (2006.01) |
| *F16C 33/58* | (2006.01) |

(52) U.S. Cl.
CPC ............ *F02C 7/06* (2013.01); *F01D 25/18* (2013.01); *F16C 33/58* (2013.01); *F16C 33/6674* (2013.01); *F16N 2210/14* (2013.01); *Y02T 50/671* (2013.01)

(58) Field of Classification Search
CPC ...... F01D 25/18; F03C 7/06; F16N 2210/02; F16N 2210/14
See application file for complete search history.

(56) References Cited

U.S. PATENT DOCUMENTS

| | | |
|---|---|---|
| 3,915,521 A | 10/1975 | Young |
| 4,468,066 A | 8/1984 | Alcorta et al. |
| 4,502,274 A | 3/1985 | Girault |
| 4,648,485 A | 3/1987 | Kovaleski |
| 5,415,478 A | 5/1995 | Matthews et al. |
| 6,409,464 B1 | 6/2002 | Fisher et al. |
| 6,428,212 B1 | 8/2002 | Tanaka |
| 6,682,222 B2 | 1/2004 | Fisher |
| 6,692,222 B2 | 2/2004 | Prinz et al. |
| 7,244,096 B2 | 7/2007 | Dins et al. |
| 7,384,197 B2 | 6/2008 | Plona |
| 2003/0039421 A1* | 2/2003 | Fisher et al. ................. 384/462 |
| 2004/0062460 A1 | 4/2004 | Dusserre-Telmon et al. |
| 2006/0062504 A1* | 3/2006 | Wilton et al. ................ 384/475 |

FOREIGN PATENT DOCUMENTS

| | | |
|---|---|---|
| CN | 1451077 A | 10/2003 |
| EP | 2031261 A2 | 3/2009 |
| WO | 0169047 A1 | 9/2001 |

OTHER PUBLICATIONS

Search Report and Written Opinion from EP Application No. 13165075.6 dated Aug. 27, 2013.
Unofficial English Translation of Chinese Office Action issued in connection with corresponding CN Application No. 201310149613.7 on Sep. 29, 2015.

* cited by examiner

*Primary Examiner* — Gerald L Sung
(74) *Attorney, Agent, or Firm* — General Electric Company; William Scott Andes

(57) ABSTRACT

The present disclosure involves an oil scoop manifold receives and directs the oil in fore and aft directions to lubricate multiple bearing assemblies.

20 Claims, 5 Drawing Sheets

OIL SCOOP MANIFOLD

CROSS-REFERENCE TO RELATED APPLICATIONS

This application claims priority to and benefit under 35 U.S.C. §119(e) to U.S. Provisional Patent Application Ser. No. 61/639,324 filed Apr. 27, 2012, in the name of the present inventors, this provisional application being incorporated herein by reference.

BACKGROUND

Present embodiments relate generally to apparatuses and methods for delivering oil to lubricate dependent components, in an oil sump in a turbine engine. More specifically, but not by way of limitation, present embodiments relate to apparatuses and methods for delivering oil to lubricate dependent components of an oil sump of a high speed turbine shaft.

In the gas turbine engine, air is pressurized in a compressor and mixed with fuel in a combustor for generating hot combustion gases which flow downstream through turbine stages. These turbine stages extract energy from the combustion gases. A high pressure turbine includes a first stage nozzle and a rotor assembly including a disk and a plurality of turbine blades. The high pressure turbine first receives the hot combustion gases from the combustor and includes a first stage stator nozzle that directs the combustion gases downstream through a row of high pressure turbine rotor blades extending radially outwardly from a first rotor disk. In a two stage turbine, a second stage stator nozzle is positioned downstream of the first stage blades followed in turn by a row of second stage turbine blades extending radially outwardly from a second rotor disk. The stator nozzles direct the hot combustion gas in a manner to maximize extraction at the adjacent downstream turbine blades.

The first and second rotor disks are joined to the compressor by a corresponding rotor shaft for powering the compressor during operation. These are typically referred to as the high pressure turbine. The turbine engine may include a number of stages of static air foils, commonly referred to as vanes, interspaced in the engine axial direction between rotating air foils commonly referred to as blades. A multi-stage low pressure turbine follows the two stage high pressure turbine and is typically joined by a second shaft to a fan disposed upstream from the compressor in a typical turbofan aircraft engine configuration for powering an aircraft in flight.

As the combustion gases flow downstream through the turbine stages, energy is extracted therefrom and the pressure of the combustion gas is reduced. The combustion gas is used to power the compressor as well as a turbine output shaft for power and marine use or provide thrust in aviation usage. In this manner, fuel energy is converted to mechanical energy of the rotating shaft to power the compressor and supply compressed air needed to continue the process.

In turbine engines, the rotor shaft rotates at a very high rate of speed and is supported for such rotation by various bearings at different areas of the turbine engine. One issue with turbine engines is how to provide under race lubrication for these bearings and ensure proper lubrication to multiple parts while balancing the extremely tight confines of the turbine engine area.

Additionally, in order to meet space and weight saving goals, it is desirable to oil two or more parts with a single oiling scoop or component. No current parts have provided such under race lubrication to multiple bearings or seal runners. Since these multiple components are spaced fore and aft along the rotor shaft, it would also be desirable that the oil scoop provide proper oiling in both directions.

As may be seen by the foregoing, there is a need for an oil scoop manifold which provides oil from a sump to two or more bearings. Additionally it would be desirable to provide such lubrication at least under race and to provide the lubrication both in the forward and aft directions.

SUMMARY

The present disclosure involves an oil scoop manifold which receives oil from a sump or a nozzle and directs the oil in fore and aft directions to oil multiple oil dependent components, such as for example bearings, seal runners and the like. The oil scoop manifold provide oil under or within bearing races allowing proper lubrication of these high speed components. The oil scoop manifold provides lubrication to multiple parts where space is limited and does not allow for dedicated scoops and nozzles for each component.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of this invention, and the manner of attaining them, will become more apparent and the oil scoop manifold will be better understood by reference to the following description of embodiments taken in conjunction with the accompanying drawings, wherein.

DETAILED DESCRIPTION

Figure 1:
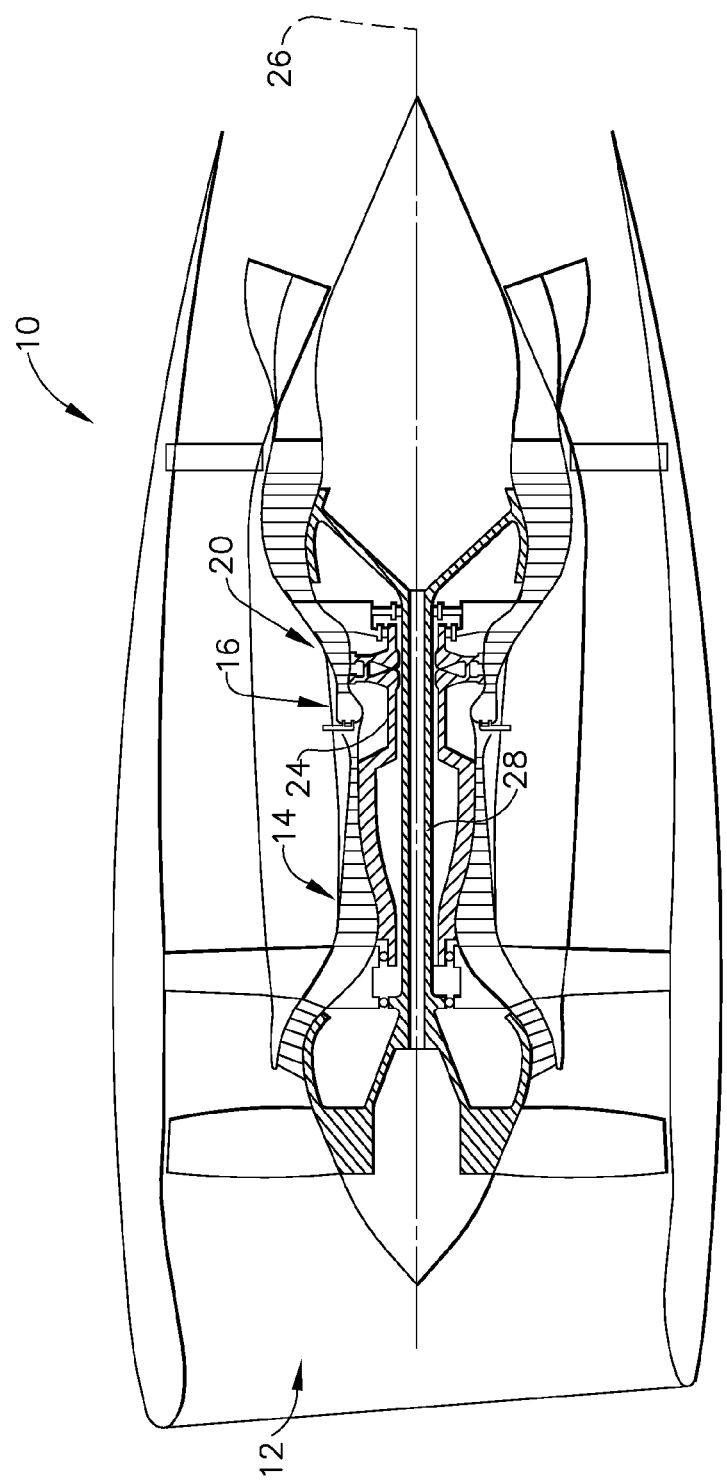
FIG. 1 is a side section view of an exemplary turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

The present embodiments provide a one-piece solution for minimizing weight and saving space while providing the requisite function of providing oil to rotor shaft bearings. The oil scoop manifold provides oil in both a fore and aft direction and further provides such oil to multiple parts. The oil scoop manifold further supplies oil under race.

The terms fore and aft are used with respect to the engine axis and generally mean toward the front of the turbine engine or the rear of the turbine engine in the direction of the engine axis.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component. As used herein, the terms "lateral" or "laterally" refer to a dimension that is perpendicular to both the axial and radial dimensions.

Referring now to FIGS. 1-5, the various embodiments depict apparatuses and methods of supplying oil from a sump to bearings and other lubricant dependent components. The oil scoop manifold provides oil in the fore and aft directions while supplying ample oil, within races of bearings, as well as other components.

Referring initially to FIG. 1, a schematic side section view of a gas turbine engine 10 is shown having an engine inlet end 12, a compressor 14, a combustor 16 and a multi-stage high pressure turbine 20. The gas turbine 10 may be used for aviation, power generation, industrial, marine or the like. Depending on the usage, the engine inlet end 12 may alternatively contain multistage compressors rather than a fan. The gas turbine 10 is axis-symmetrical about engine axis 26 or shaft 24 (FIG. 2) so that various engine components rotate thereabout. In operation air enters through the air inlet end 12 of the engine 10 and moves through at least one stage of compression where the air pressure is increased and directed to the combustor 16. The compressed air is mixed with fuel and burned providing the hot combustion gas which exits a combustor nozzle toward the high pressure turbine 20. At the high pressure turbine 20, energy is extracted from the hot combustion gas causing rotation of turbine blades which in turn cause rotation of the shaft 24 which passes toward the front of the engine to continue rotation of the one or more compressors 14, a turbo fan or inlet fan blades, depending on the turbine design.

The axis-symmetrical shaft 24 extends through the through the turbine engine, forward end into an aft end and is supported by bearings along its length. The shaft 24 may be hollow to allow rotation of a low pressure turbine shaft 28 therein. Both shafts 24, 28 may rotate about a centerline 26 of the engine. During operation the shafts 24, 28 rotate along with other structures connected to the shafts such as the rotor assemblies of the turbine 20 and compressor 14 in order to create power or thrust depending on the area of use, for example power, industrial or aviation.

Rotation of the shaft 24 is supported by bearings which operate in oil sumps to cool and lubricate parts during the high speed revolution. Due to the high-speed revolution of the turbine, the bearings are located within oil sumps wherein lubricating fluid is captured for delivery to lubricate dependent parts. The sumps may feed oil directly or may feed nozzles which in turn feed oil to related components. As shown in FIG. 1, a forward bearing area 18 is depicted wherein an oil scoop manifold 60 (FIG. 2) may be utilized. However, this is one exemplary location and should not be considered limiting as various alternate locations may house such bearing structure as well.

Figure 2:
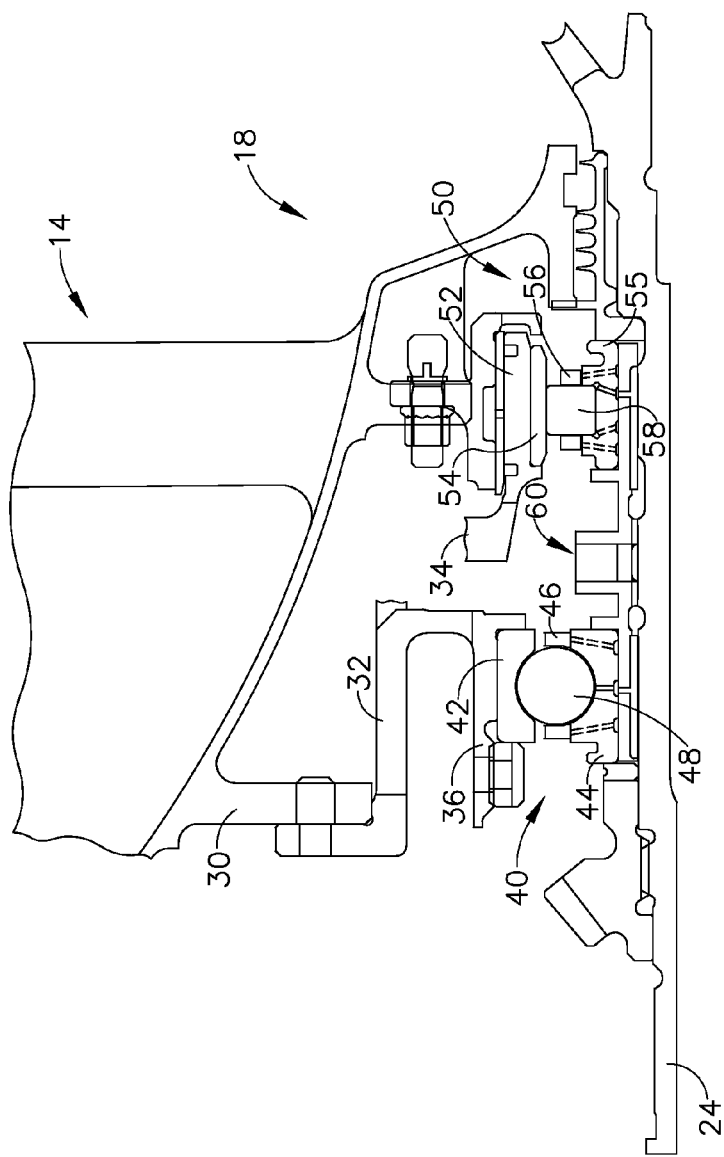
FIG. 2 is a side section view of a forward oil sump in a turbine engine.

Referring now to FIG. 2, a detail side view of the exemplary forward bearing area 18 is depicted. At the top of the figure is a portion of the compressor 14 for purpose of perspective. A flange 30 depends from the frame structure and first and second mounts 32, 34 are connected to the flange 30. The mounts 32, 34 function in part to support the bearing assembly 40, 50 and to allow some flexing due to vibration or shock of the rotating shaft 24 which maybe received through the bearing assemblies 40, 50. The first mount 32 depends downwardly and provides a support 36 for a ball bearing assembly 40. The bearing assembly 40 comprises an outer race 42 and an inner race 44 between which a carrier or band 46 is mounted and retains the plurality of balls 48. The bearing assembly 40 extends circumferentially about the shaft 24 and the centerline axis 26.

Beneath the bearing 40 is an oil scoop manifold 60 which extends circumferentially about the shaft 24. The oil scoop manifold 60 may be interference fit on the shaft 24, for example, although other methods of affixing the parts may be used. The oil scoop manifold 60 functions as a seat for the bearing assembly 40 so that rotation of the shaft 24 causes rotation of the scoop manifold 60 and rotation of the inner race 42. Similarly, the oil scoop manifold 60 also serves as a seat for the bearing assembly 50.

Extending adjacent the mount 32 is a second mount 34 extending to support a roller bearing assembly 50. The assembly includes a bearing mount 52, outer race 54 and inner race 55, and a roller 58. The roller 58 is supported by a carrier 56. Like the ball bearing assembly 40, the roller bearing assembly 50 extends circumferentially about the shaft 24 to support rotation and is seated on the oil scoop manifold 60.

Together, the ball bearing assembly 40 and the roller bearing assembly 50 allow for rotation of the shaft 24, for example high pressure shaft, about the center line 26. Moreover, the oil scoop manifold 60 provides a means for providing oil to the bearing assemblies 40, 50.

Figure 3:
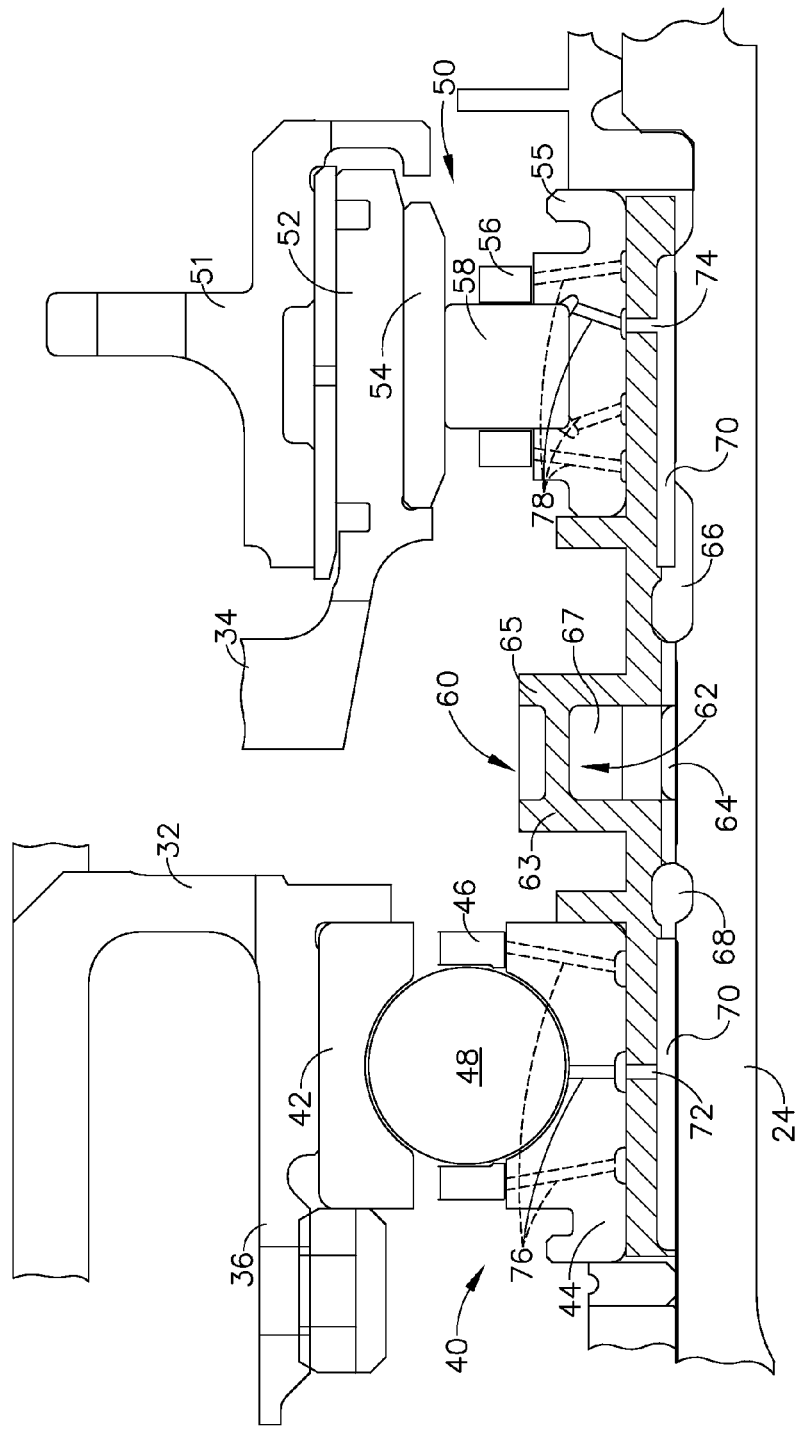
FIG. 3 is a detail side section view of roller and ball bearings in the forward oil sump mounted on the oil scoop manifold.

Referring now to FIG. 3 a detailed side section view of oil scoop manifold 60 and the ball bearing assembly 40 and the roller bearing assembly 50 are shown. The oil scoop manifold 60 is mounted by way of interference fit on the high pressure shaft 24. The oil scoop manifold 60 has a central scoop 62 which passes through an oil bath during rotation of the scoop 60 according to one embodiment. According to an alternative embodiment, a nozzle adjacent the oil scoop manifold 60 may spray the scoop 62 with an oil stream. The central scoop 62 includes two sidewalls 63,65 and a lower surface 67 which directs received oil to a pathway 64. The scoop geometry 62 may vary depending on a number of characteristics such as number of blades, blade geometry shaft size, rotation speed, and number of components needing oil, for example. The scoop geometry may also be varied to optimize scoop efficiency and the amount of oil captured. The pathway 64 is in fluid communication with at least one collection weir on an inside of the scoop 60. The exemplary manifold 60 includes two collection weirs 66, 68. As will be described further, the exemplary device utilizes two weirs each feeding oil in one of two directions, the forward and aft directions, with respect to the shaft. Thus the oil scoop manifold 60 allows lubrication of the ball bearing assembly 40 and the roller bearing assembly 50.

The weirs 66, 68 receive oil from a pathway or reservoir 64 feed to axial manifold slots 70. The weirs 66, 68 extend annularly about the inside surface of the manifold 60. Since the manifold 60 is interference fit on the shaft 24, the slots 70 create a clearance for flow of oil or other lubricant. These axial slots 70 feed fluid fore and aft between the shaft and the manifold 60 toward the bearing assemblies 40, 50 the beneath the inner races 44, 55 so as to provide oil to the ball bearing assembly 40 and the roller bearing assembly 50. In fluid communication with the axial slots are bores or holes 72, 74 to feed the bearing assemblies 40, 50 respectively. The bores may extend radially or be angled. Accordingly, each of the bearing races 44, 55 has a plurality of bores to supply oil or other cooling lubricant to the ball bearing 48 and roller bearing 58 respectively.

At the high speed revolution of the high pressure shaft 24, the oil scoop manifold 60 functions as a pump to receive oil, directing the oil from the outer surface of the scoop 60 to the inner surface of the scoop adjacent the shaft 24 and continuing axially toward the radial holes 72, 74 in order to supply oil to each bearing assembly 40, 50. At the ball bearing assembly 40, the radial holes 72 feed oil to holes 76 to feed various components of the bearing assembly 40. At the roller bearing assembly 50, radial holes 74 feed oil to the holes 78.

Figure 4:
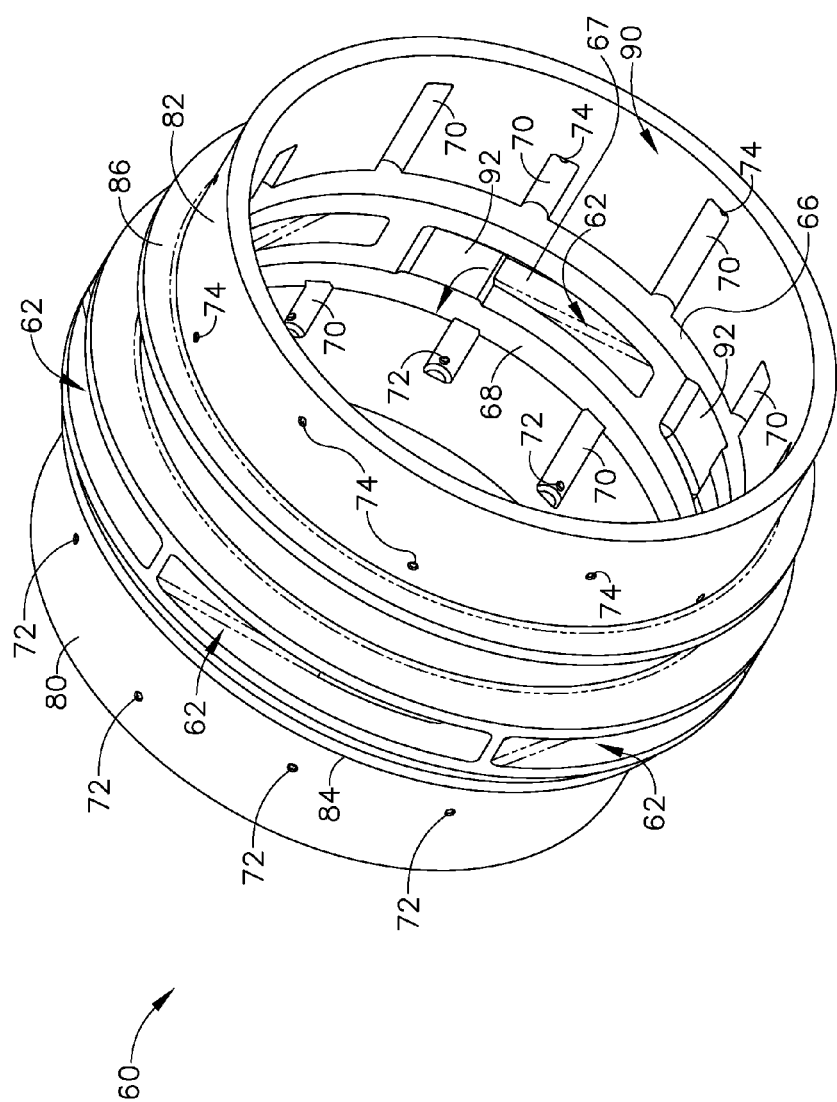
FIG. 4 is a perspective view of an exemplary embodiment of the oil scoop manifold.

Referring now to FIG. 4, the oil scoop manifold 60 is shown in perspective view. The center scoop 62 is shown between bearing landings 80, 82 whereupon bearing assemblies 40, 50 may be positioned. Shown dispersed along the landings 80, 82 are the multiple radial holes 72, 74 to direct oil into the assemblies as previously described. The landings 80, 82 include bearing seats 84, 86 against which the inner races 44, 55 may be positioned to define a proper position for the bearings. The seats 84, 86 act as bearing spacers to properly locate bearings on the manifold 60. However, the exemplary embodiments allow this to occur with a single part thereby simplifying construction and minimizing weight. Between the seats 84, 86 are the plurality of scoop structures 62 which receive and allow oil to pass from the outer surface of the scoop manifold 60 to an inner surface 90. Each scoop 62 includes an inner reservoir 92. The scoops 62 and reservoirs 92 are aligned in a single circumferential row allowing for a part of reduced length and weight, which improves engine performance. Oil spills from the reservoir into the weirs 66, 68. Each reservoir 92 directs oil into a path for feeding oil in either a fore or aft direction. However, in alternate embodiments, the oil could be fed in both directions from a single reservoir.

From the weirs 66, 68, the oil spills over into the radial slots 70. According to at least one embodiment, radial slots 70 are of differing length resulting in the radial holes 72, 74 not being aligned in the circumferential direction. The weirs 66, 68 allow oil to move from the scoop 62 and into the holes 72, 74 by way of feed slots 70, which extend in axially opposite directions adjacent the shaft 24. The axial slots 70 feed to the radial holes 72, 74 which are shown also on the inside of the scoop manifold 60 feeding to the bearing assembly 40, 50.

Figure 5:
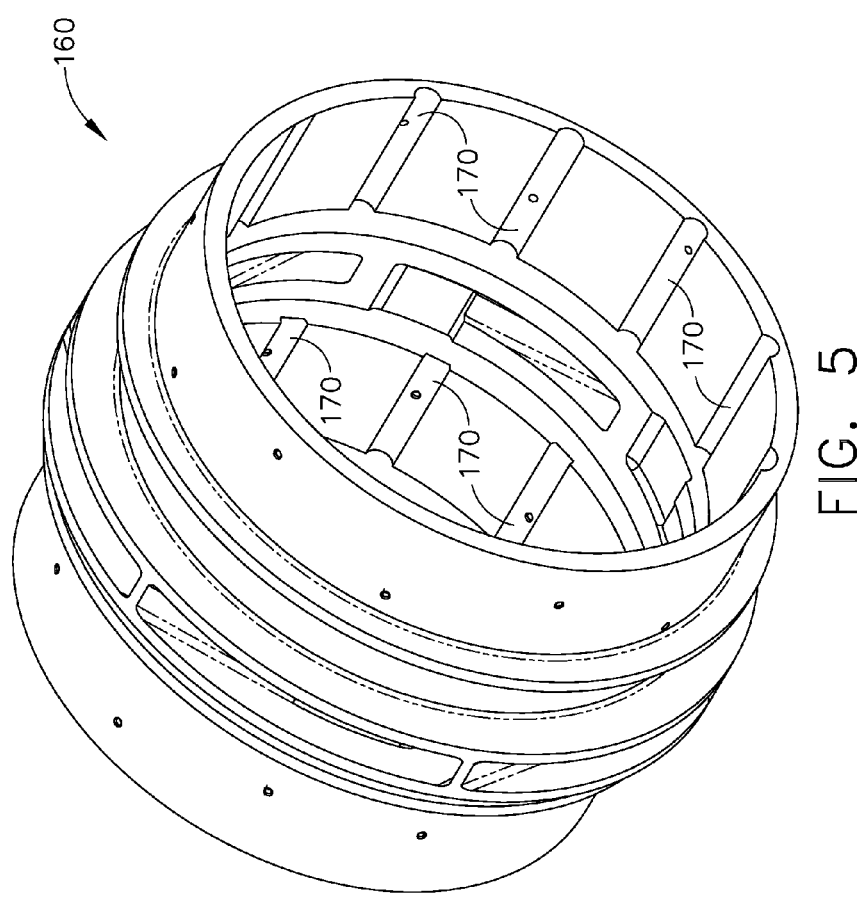
FIG. 5 is a perspective view of an alternative oil scoop manifold.

Referring now to FIG. 5, an alternate oil scoop manifold 160 is depicted in an exemplary embodiment. According to the embodiment of FIG. 4, each of the axial slots 70 are of varying length, wherein each radial hole or bore 72, 74 is located at an end of the axial slot 70. According to some embodiments, the scoop 160 includes a plurality of axial slots 170 which are all of equivalent length. These slots 170 may or may not extend to the axial end of each side of the scoop 160. The radial holes or bores 72, 74 are located along the pathways of the axial slots 170 and are offset from one another in the axial direction at different lengths to provide oiling at multiple locations for each bearing assembly 40, 50.

Due to the interference between the manifold scoop 60, 160 and the shaft 24, oil is limited to travel through the pathway defined by the weirs, reservoirs and axial slots. These parts are defined within the material of the exemplary scoops so as to provide some clearance for oil flow therethrough. Accordingly, the scoops described and shown herein act as a pump to provide oil to multiple bearing assemblies and in different directions, relative to the shaft 24.

The oil scoop manifold provides a compact design that combines features of multiple components and functions and thereby minimizes manufacturing complexity. According to this design, a lower weight part is constructed having a minimal number of parts.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An oil scoop manifold, comprising:
a first cylindrical landing and a second cylindrical landing spaced from said first cylindrical landing, both said first landing and said second landing being hollow cylindrical structures with an interior surface and an exterior surface;
a plurality of oil scoops aligned in a single circumferential row disposed between said first landing and said second landing;
at least one reservoir in fluid communication with said plurality of oil scoops;
a plurality of axial slots extending from said at least one reservoir in aft and forward directions along the interior surface of said first landing and said second landing;
radial holes associated with said plurality of axial slots, said radial holes allowing movement of oil from said plurality of axial slots from the interior surface of said first landing toward the exterior surface of said first landing, or from the interior surface of said second landing toward the exterior surface of said second landing.

2. The oil scoop manifold of claim 1, said plurality of axial slots having at least two differing lengths.

3. The oil scoop manifold of claim 2, said radial holes being offset from one another in a circumferential direction.

4. The oil scoop manifold of claim 1, said axial slots being of equivalent length.

5. The oil scoop manifold of claim 4, said axial slots extending to ends of said first and second cylindrical landings.

6. The oil scoop manifold of claim 4, said radial holes disposed at varying axial positions of said slots.

7. The oil scoop manifold of claim 1, further comprising bearing seats extending circumferentially about outer surfaces of said first cylindrical landing and said second cylindrical landing.

8. The oil scoop manifold of claim 1, said scoop defined by a first wall and a second wall.

9. The oil scoop manifold of claim 8, further comprising a lower surface passing between said first wall and said second wall.

10. The oil scoop manifold of claim 9, further comprising a pathway in said lower surface passing through toward an inner surface of said first landing or said second landing.

11. The oil scoop manifold of claim 8, further comprising an angled lower surface passing between said first wall and said second wall.

12. The oil scoop manifold of claim 1, further comprising at least one aft wier disposed between said reservoir and said axial slots.

13. The oil scoop manifold of claim 12, said at least one aft wier in fluid communication with some of said axial slots.

14. The oil scoop manifold of claim 12, further comprising at least one forward wier disposed between said reservoir and said axial slots.

15. The oil scoop manifold of claim 14, said at least one forward wier in fluid communication with some of said axial slots.

16. The oil scoop manifold of claim 1, said radial holes being angled.

17. An oil scoop manifold, comprising:
a first wall and a second wall defining a single circumferential row having at least one reservoir and having at least one scoop therein;
first and second landings extending axially from said first and second walls, both said first landing and said second landing being hollow cylindrical structures with an interior surface and an exterior surface;
a weir in fluid communication with said reservoir;
axial slots extending forward and aft along inner surfaces of said landings in flow communication with said weir;
radial holes in fluid communication with said axial slots extending from the interior surface toward the exterior surface of said first and second landings;
said radial holes located at varying distances from said first and second wall.

18. The oil scoop manifold of claim 17, said weir extending circumferentially along said inner surfaces of said landings.

19. The oil scoop manifold of claim 17, said axial slots being at least one of a first axial length and a second axial length.

20. An oil scoop manifold, comprising:
a first cylindrical landing and a second cylindrical landing separated by a scoop and reservoir, both said first landing and said second landing being hollow cylindrical structures with an interior surface and an exterior surface, said scoop and reservoir being aligned in a single circumferential row;
said reservoir in fluid communication with a weir extending circumferentially along the inner surface of said landings;
a plurality of axial slots in flow communication with said weir, said plurality of axial slots extending fore and aft along the interior surface of said first landing and said second landing;
said axial slots each having radial holes for delivery of oil from said slots through an outer surface of said landings;
a plurality of radial holes located along said axial slots allowing oil to pass through said first and second cylindrical landings from the interior surface toward the exterior surface of said first and second landings.

* * * * *

UNITED STATES PATENT AND TRADEMARK OFFICE
CERTIFICATE OF CORRECTION

PATENT NO.        : 9,441,541 B2
APPLICATION NO.   : 13/793266
DATED             : September 13, 2016
INVENTOR(S)       : Wotzak Page 1 of 1

It is certified that error appears in the above-identified patent and that said Letters Patent is hereby corrected as shown below:

In the Specification

In Column 3, Lines 62-63, delete "through the through the" and insert -- through the --, therefor.

In Column 4, Lines 39-40, delete "inner race 42." and insert -- inner race 44. --, therefor.

In Column 4, Line 55, delete "FIG. 3" and insert -- FIG. 3, --, therefor.

In the Claims

In Column 8, Line 13, in Claim 12, delete "wier" and insert -- weir --, therefor.

In Column 8, Line 16, in Claim 13, delete "wier" and insert -- weir --, therefor.

In Column 8, Line 19, in Claim 14, delete "wier" and insert -- weir --, therefor.

In Column 8, Line 22, in Claim 15, delete "wier" and insert -- weir --, therefor.

Signed and Sealed this
Twenty-fourth Day of January, 2017

Michelle K. Lee
*Director of the United States Patent and Trademark Office*